United States Patent [19]

Casale et al.

[11] Patent Number: 5,856,037
[45] Date of Patent: Jan. 5, 1999

[54] BATTERY VENTING SYSTEM AND METHOD

[75] Inventors: Thomas J. Casale, Aurora; Larry K. W. Ching, Littleton, both of Colo.; Jose T. Baer, Gaviota; David H. Swan, Monrovia, both of Calif.

[73] Assignees: Optima Batteries, Inc., Aurora, Colo.; Aerovironment, Inc., Monrovia, Calif.

[21] Appl. No.: 888,478

[22] Filed: Jul. 7, 1997

[51] Int. Cl.⁶ .................................................. H01M 2/12
[52] U.S. Cl. ................................ 429/82; 429/50; 429/88; 429/175
[58] Field of Search ................................ 429/72, 82, 84, 429/87, 175, 50, 88

[56] References Cited

U.S. PATENT DOCUMENTS

| | | | |
|---|---|---|---|
| 1,469,119 | 9/1923 | Stallings . | |
| 2,182,492 | 12/1939 | Hall | 136/177 |
| 2,530,539 | 11/1950 | Raney et al. | 136/177 |
| 3,825,444 | 7/1974 | Martin | 136/6 P |
| 4,064,725 | 12/1977 | Hug et al. | 72/147 |
| 4,087,592 | 5/1978 | Okazaki et al. | 429/63 |
| 4,107,398 | 8/1978 | Lindenberg et al. | 429/88 |
| 4,207,387 | 6/1980 | Jutte | 429/88 |
| 4,212,179 | 7/1980 | Juergens | 72/148 |
| 4,346,151 | 8/1982 | Uba et al. | 429/54 |
| 4,383,011 | 5/1983 | McClelland et al. | 429/54 |
| 4,421,832 | 12/1983 | Uba | 429/72 |
| 4,606,982 | 8/1986 | Nelson et al. | 429/59 |
| 4,637,966 | 1/1987 | Uba et al. | 429/57 |
| 4,648,177 | 3/1987 | Uba et al. | 29/623.2 |
| 4,780,379 | 10/1988 | Puester | 429/59 |
| 5,091,273 | 2/1992 | Hug et al. | 429/59 |
| 5,120,620 | 6/1992 | Nelson et al. | 429/225 |
| 5,283,137 | 2/1994 | Ching | 429/175 |
| 5,415,956 | 5/1995 | Ching | 429/187 |
| 5,549,986 | 8/1996 | Heiman et al. | 429/175 |
| 5,565,282 | 10/1996 | Feres et al. | 429/84 |
| 5,599,641 | 2/1997 | Ching, Jr. et al. | 429/179 |
| 5,663,010 | 9/1997 | Stocchiero | 429/86 |
| 5,665,483 | 9/1997 | Saito et al. | 429/53 |

OTHER PUBLICATIONS

U.S. application No. 08/853,377, Olson, filed May 8, 1997.

*Primary Examiner*—Anthony Skapars
*Attorney, Agent, or Firm*—Klaas, Law, O'Meara & Malkin, P.C.; Michael A. Goodwin

[57] ABSTRACT

Disclosed herein is a venting mechanism for a battery. The venting mechanism includes a battery vent structure which is located on the battery cover and may be integrally formed therewith. The venting mechanism includes an opening extending through the battery cover such that the opening communicates with a plurality of battery cells located within the battery case. The venting mechanism also includes a vent manifold which attaches to the battery vent structure. The vent manifold includes a first opening which communicates with the battery vent structure opening and second and third openings which allow the vent manifold to be connected to two separate conduits. In this manner, a plurality of batteries may be interconnected for venting purposes, thus eliminating the need to provide separate vent lines for each battery. The vent manifold may be attached to the battery vent structure by a spin-welding technique. To facilitate this technique, the vent manifold may be provided with a flange portion which fits into a corresponding groove portion on the battery vent structure. The vent manifold includes an internal chamber which is large enough to completely house a conventional battery flame arrester and overpressure safety valve. In this manner, the vent manifold, when installed, lessens the likelihood of tampering with the flame arrester and safety valve.

17 Claims, 8 Drawing Sheets

BATTERY VENTING SYSTEM AND METHOD

CONTRACTUAL ORIGIN OF THE INVENTION

The Government of the United States of America has rights in this invention pursuant to sub-contract ZCB-4-13032-10 (sub-sub-contract TCB01613) awarded by the U.S. Department of Energy.

FIELD OF THE INVENTION

The present invention relates generally to electric batteries and, more particularly, to a system and method for venting gases generated by batteries.

BACKGROUND OF THE INVENTION

Electric batteries are commonly used to store and deliver electrical energy. One type of electric battery, known as a lead-acid battery, is commonly employed in vehicles (e.g. cars, trucks, boats, aircraft, and the like) for ignition, lighting, and other related purposes. These applications are typically known as "SLI" or "starting-lighting-ignition" functions.

A conventional lead-acid battery typically includes a number of electrochemical cells housed within a single battery housing. The electrochemical cells within a lead-acid battery are typically electrically connected in a series relationship such that the voltage supplied by the overall battery will be equal to the sum of individual voltages supplied by each electrochemical cell. In a typical application, for example, six two-volt electrochemical cells may be electrically connected within the housing of a single battery such that the battery supplies electrical energy at a voltage of twelve volts.

Each electrochemical cell in a lead-acid battery typically includes electrically-conductive positive and negative current collectors typically manufactured in the form of foraminous (porous) metallic grids. The individual current collectors may be planar (flat) in configuration or spirally-wound as discussed further below. Lead-acid electrochemical cells further include a supply of electrolyte solution therein. This electrolyte solution may be used in different ways within a given electrochemical cell. For example, the electrolyte may be present in liquid form wherein the electrolyte is not contained or absorbed in any structures. This type of battery is normally characterized as a "flooded battery" or "free electrolyte battery." Flooded batteries are generally constructed from planar (flat) positive and negative plates which are arranged in a parallel configuration having the electrolyte solution therebetween.

In contrast, another type of electrochemical cell which is conventionally known as a "retained electrolyte battery" involves a system in which the electrolyte solution is absorbed and retained within a separator element positioned between the plates. Retained electrolyte batteries may involve plate structures which are planar (flat) in configuration and arranged in a parallel orientation having the electrolyte-containing separator member positioned therebetween. Representative electrochemical cells of this type are discussed in the following U.S. Pat. Nos. 4,421,832 of Uba for ELECTROCHEMICAL CELL and 5,120,620 of Nelson et al. for BINARY LEAD-TIN ALLOY SUBSTRATE FOR LEAD-ACID ELECTROCHEMICAL CELLS, both of which are hereby specifically incorporated by reference for all that is disclosed therein.

In addition, retained electrolyte batteries may also be produced in a spirally wound configuration in which the positive and negative plates are wound together with the electrolyte-containing separator element positioned therebetween. Examples of this particular battery type are presented in the following U.S. Pat. Nos. 4,064,725 of Hug et al for APPARATUS FOR MAKING SPIRALLY WOUND ELECTROCHEMICAL CELLS; 4,212,179 of Juergens for DRIVEN MANDREL AND METHOD; 4,346,151 of Uba et al. for MULTICELL SEALED RECHARGEABLE BATTERY; 4,383,011 of McClelland et al. for MULTICELL RECOMBINING LEAD-ACID BATTERY; 4,606,982 of Nelson et al. for SEALED LEAD-ACID CELL AND METHOD; 4,637,966 of Uba et al for SEALED LEAD-ACID CELL; 4,648,177 of Uba et al. for METHOD FOR PRODUCING A SEALED LEAD-ACID CELL; 4,780,379 of Puester for MULTICELL RECOMBINANT LEAD-ACID BATTERY WITH VIBRATION RESISTANT INTERCELL CONNECTOR; and 5,091,273 of Hug et al. for METHOD OF APPLYING A TAIL WRAP TO A WOUND ELECTROCHEMICAL CELL AND CELL PRODUCED BY THE METHOD and in U.S. patent application Ser. No. 08/853,377, filed May 8, 1997 of John B. Olson for IMPROVED BATTERY PASTE COMPOSITIONS AND ELECTROCHEMICAL CELLS FOR USE THEREWITH and in U.S. patent application Ser. No. 08/888,905, filed Jul. 7, 1997, for BATTERY INTERNAL TEMPERATURE MEASUREMENT APPARATUS AND METHOD of Thomas J. Casale and Larry K. W. Ching, which are all hereby specifically incorporated by reference for all that is disclosed therein. Spirally wound batteries offer a high degree of efficiency and capacity in a minimal amount of physical space.

Lead-acid batteries may also be produced in two additional types, namely, (1) sealed; and (2) unsealed. In an unsealed battery, the interior of the battery housing is open to the ambient (outside) environment such that fluid communication exists between the interior and the exterior of the battery housing. Thus, in an unsealed battery, hydrogen and oxygen gases, which are produced by all lead-acid batteries during charging, are allowed to escape from the battery housing into the surrounding atmosphere.

Sealed batteries are also known as "recombinant" or "starved electrolyte" batteries. In this type of battery, the battery housing is substantially sealed to prevent the egress of gases therefrom during normal operating situations. In a sealed lead-acid battery, hydrogen and oxygen generated by the battery are retained within the battery housing and allowed to recombine into water molecules. A representative sealed (recombinant) battery system is discussed, for example, in U.S. Pat. No. 4,383,011, previously referenced.

Although referred to as a "sealed" battery, this type of battery typically includes a vent opening in the battery housing in order to relieve over-pressurization within the housing which may occur, for example, when the battery is abusively overcharged. The vent opening is typically in fluid communication with all of the cells of the battery such that gas generated by any of the cells may be vented. The vent opening is generally provided with a resealable safety valve which serves to release internal gas pressure above a predetermined superatmospheric pressure. The safety valve typically also functions as a check valve allowing gas flow in only one direction (i.e. out of the battery housing). A type of safety valve which is commonly used in sealed batteries for the above purposes is known as a "Bunsen" valve. A typical Bunsen valve may be designed to allow gas flow out of the battery housing only when the pressure differential between the housing interior and the ambient atmosphere reaches, for example, about 10 psi. Examples of batteries incorporating such safety valves are described in U.S. Pat. Nos. 4,346,151; 4,383,011; 4,421,832; 4,637,966 and 4,648,177, all previously referenced.

Gases produced by batteries, as described above, may create dangerous conditions under certain circumstances. As is well known, hydrogen gas, for example, is extremely flammable and may present an explosion risk if allowed to accumulate to a high enough concentration. In most single battery applications, the most significant risk posed by such hydrogen gas accumulation is that a spark near the battery will ignite the gas which has accumulated outside of the battery housing. The resulting flame may, in some cases, then propagate into the battery housing and ignite the hydrogen gas contained therein. This ignition of the gases within the housing may cause the battery housing to rupture and some of the acid contained within the battery housing to be ejected therefrom.

To counter this risk, most modern batteries are provided with flame arresters. Such flame arresters may be formed of a porous material which allows the passage of gas, but prevents flame propagation therethrough. In a sealed battery, for example, such a flame arrester may be located adjacent the safety valve.

Although the use of flame arresters generally prevents battery explosions, as described above, dangerous levels of gases, e.g., hydrogen gas, may still accumulate on the outside of battery housings in some situations. This problem of gas accumulation is heightened in multiple battery applications, e.g., applications where several batteries are located in close proximity to one another. One example of such a multiple battery application is a battery powered vehicle in which a cluster of batteries may be provided in a battery compartment. In multiple battery applications, due to the large number of batteries located in a relatively small and, sometimes, confined area, battery gases may accumulate to dangerous levels.

Escaping battery gases also may carry electrolyte and/or acid out of the battery container and into the surrounding environment in the form of aerosol-like droplets. Such electrolyte and/or acid may cause damage to items with which it comes into contact.

Accordingly, even when batteries having flame arresters are used, it is desirable to provide venting of the individual batteries away from the battery compartment area in multiple battery applications.

SUMMARY OF THE INVENTION

The present invention is directed to a venting mechanism for a battery. The venting mechanism includes a battery vent structure which is located on the battery cover and may be integrally formed therewith. The venting mechanism includes an opening extending through the battery cover such that the opening communicates with a plurality of battery cells located within the battery case.

The venting mechanism also includes a vent manifold which attaches to the battery vent structure. The vent manifold includes three openings. A first opening communicates with the battery vent structure opening when the vent manifold is installed on the battery vent structure. Second and third openings allow the vent manifold to be connected to two separate conduits. In this manner, a plurality of batteries may be interconnected for venting purposes, thus eliminating the need to provide separate vent lines for each battery.

The vent manifold may be attached to the battery vent structure by a spin-welding technique. To facilitate this technique, the vent manifold may be provided with a flange portion which fits into a corresponding groove portion on the battery vent structure.

The vent manifold includes an internal chamber which is large enough to completely cover a conventional battery flame arrester and an overpressure safety valve. In this manner, the vent manifold, when installed, lessens the likelihood of tampering with the flame arrester and safety valve.

DETAILED DESCRIPTION OF THE INVENTION

Figure 1:
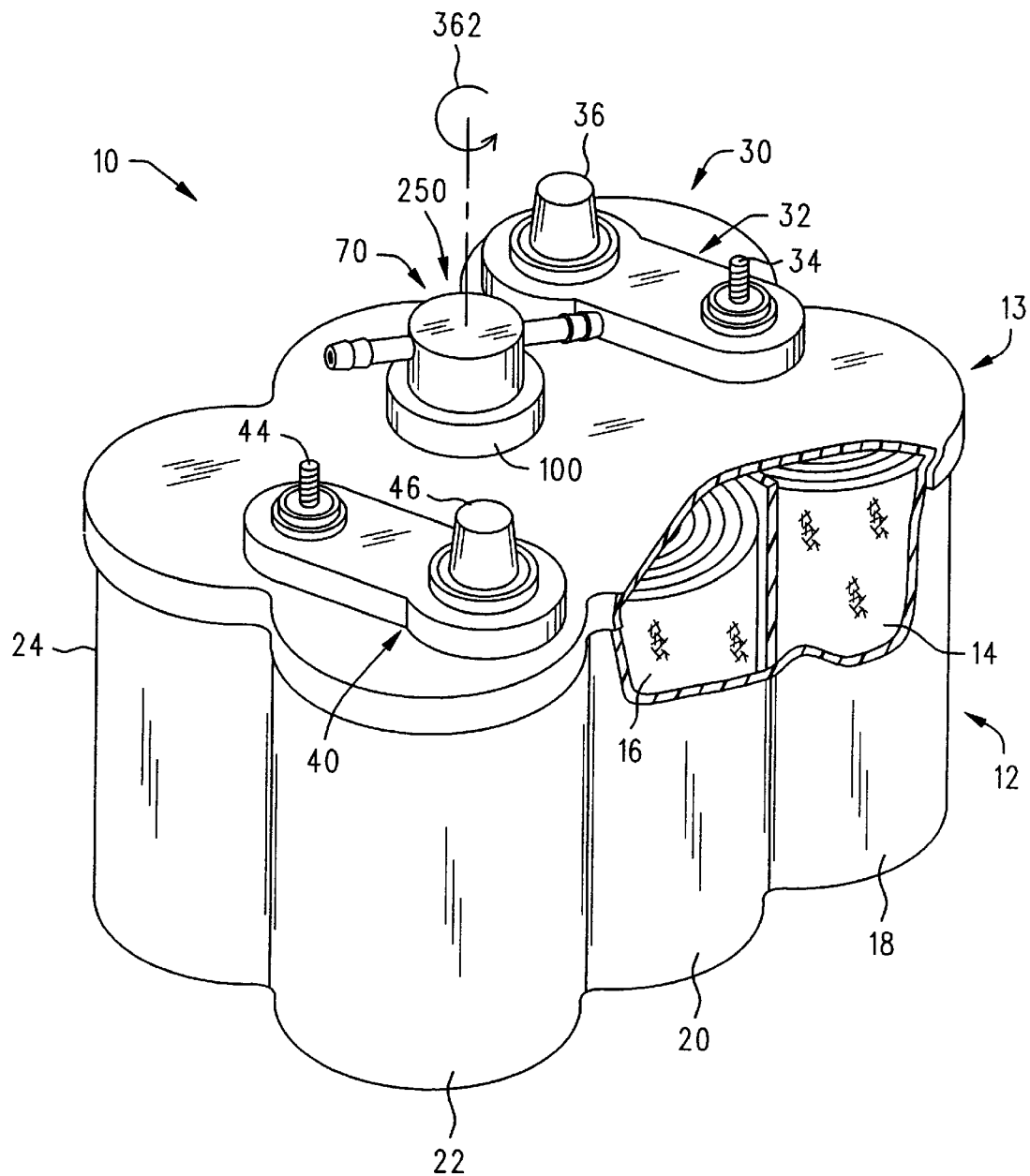
FIG. 1 is a top perspective view of battery having a vent manifold mounted on a battery vent structure located on the battery housing cover.

FIGS. 1–8, in general, illustrate a venting system for venting gas from a plurality of batteries 10, 380, 400, 420. The system includes at least a first battery 10, 380 including a first battery container 12, 30, a plurality of first battery cells 13 housed within the first battery container 12, 30 and a first battery container opening 102 located in the first battery container 12, 30. The first battery container opening 102 is in fluid communication with each of the plurality of first battery cells 13. The system also includes at least a first vent manifold 250, 390 including a first vent manifold first opening 300, 392, a first vent manifold second opening 328, 394 in fluid communication with the first vent manifold first opening 300, 392 and a first vent manifold third opening 348, 396 in fluid communication with the first vent manifold first opening 300, 392 and the first vent manifold second opening 328, 394. The first vent manifold 250, 390 is attached to the first battery container 12, 30 and the first vent manifold first opening 300, 392 is in fluid communication with the first battery container opening 102.

FIGS. 1–8, also illustrate, in general a cover assembly 30 for a battery case 12 of the type adapted to house at least one battery cell 13 of a battery device 10. The battery case cover assembly includes a battery case cover portion 100 which includes a vent opening 102 therethrough, a groove 200 formed in the battery case cover portion 100, the groove 200 substantially surrounding the vent opening 102, and a vent mechanism 250. The vent mechanism 250 includes a vent mechanism first opening 300, 392 and a vent mechanism second opening 328, 394, a tongue portion 292 substantially surrounding the vent mechanism first opening 300, 392. The vent mechanism 250 is attached to the battery case cover portion 100 with the vent mechanism first opening 300, 392 being adjacent the cover portion vent opening 102. The cover portion vent opening 102, the vent mechanism first opening 300, 392 and the vent mechanism second opening 328, 394 define a fluid flow path therethrough. The vent mechanism tongue portion 292 is at least partially located within the battery case cover portion groove 200.

FIGS. 1–8, also illustrate, in general a method of venting fluid produced by a plurality of batteries 10, 380, 400, 420 away from the vicinity of the plurality of batteries 10, 380, 400, 420. The method includes the step of providing at least a first battery 10, 380 which includes a first battery container 12, 30, a plurality of first battery cells 13 housed within the first battery container 12, 30; and a first battery container opening 102 located in the first battery container 12, 30. The first battery container opening 102 is in fluid communication with each of the plurality of first battery cells 13. The method also includes the step of providing at least a first vent manifold 250, 390 connected to the first battery container 12, 30. The at least a first vent manifold 250, 390 includes a first vent manifold first opening 300, 392, a first vent manifold second opening 328, 394 in fluid communication with the first vent manifold first opening 300, 392 and a first vent manifold third opening 348, 396 in fluid communication with the first vent manifold first opening 300, 392 and the first vent manifold second opening 328, 394. The method also includes the step of providing at least a second battery 10, 400 which include a second battery container 12, 30, a plurality of second battery cells 13 housed within the second battery container 12, 30 and a second battery container opening 102 located in the second battery container 12, 30. The second battery container opening 102 is in fluid communication with each of the plurality of second battery cells 13. The method also includes the step of establishing fluid communication between the first vent manifold second opening 328, 394 and the second battery container opening 102.

Having thus described the battery venting system and method in general, the system and method will now be described in further detail.

FIG. 1 illustrates a battery 10 which generally includes a battery case 12 and a battery cover 30 in a conventional manner. Battery case 12 and battery cover 30 may collectively be referred to herein as a "battery housing" or a "battery container" or, more simply, as a "housing" or a "container".

Battery case 12 may contain a plurality, e.g., six, battery cells 13 in a conventional manner. In the example illustrated in FIG. 1, the battery cells 13 housed within the battery case 12 are spirally wound battery cells as is apparent, for example, with respect to the spirally wound cells 14 and 16 which are housed within cylindrical battery case portions 18 and 20, respectively. The remaining cells within the battery case are each housed within similar cylindrical battery case portions, such as the cylindrical battery case portions 22, 24. Spirally wound battery cells are described, for example in U.S. Pat. Nos. 4,064,725; 4,212,179; 4,383,011; 4,606,982; 4,637,966; 4,648,177; 4,780,379 and 5,091,273, previously referenced.

Referring again to FIG. 1, battery cover 30 may include a positive terminal structure 32 and a negative terminal structure 40. The positive and negative terminal structures 32, 40 may be electrically connected to the battery cells 13 in a conventional manner. Positive terminal structure 32 may include a threaded fixture 34 to allow threaded attachment of a battery cable to the positive terminal structure 32. Positive terminal structure 32 may also include a lug fixture 36 to allow clamping attachment of a battery cable to the positive terminal structure 32. In this manner, the positive terminal structure 32 of the battery 10 may easily be connected to different types of battery cables.

In a similar manner to the positive terminal structure 32 described above, negative terminal structure 40 may include a threaded fixture 44 to allow threaded attachment of a battery cable and a lug fixture 46 to allow clamping attachment of a battery cable to the negative terminal structure 30.

As previously discussed, gases produced by batteries may create dangerous conditions under certain circumstances. As is well known, hydrogen gas, for example, is extremely flammable and may present an explosion risk if allowed to accumulate to a high enough concentration. This problem of gas accumulation is heightened in multiple battery applications, e.g., applications where several batteries are located in close proximity to one another. Accordingly, it is desirable to provide venting of batteries in order to prevent potentially dangerous accumulations of battery In order to provide for venting of battery gases away from the vicinity of the battery 10, battery cover 30 may include a venting mechanism 70 which consists of a battery vent structure 100, which may be integrally formed with the battery cover 30, and a vent manifold 250 attached to the vent structure 100 as will now be described in detail.

Figure 2:
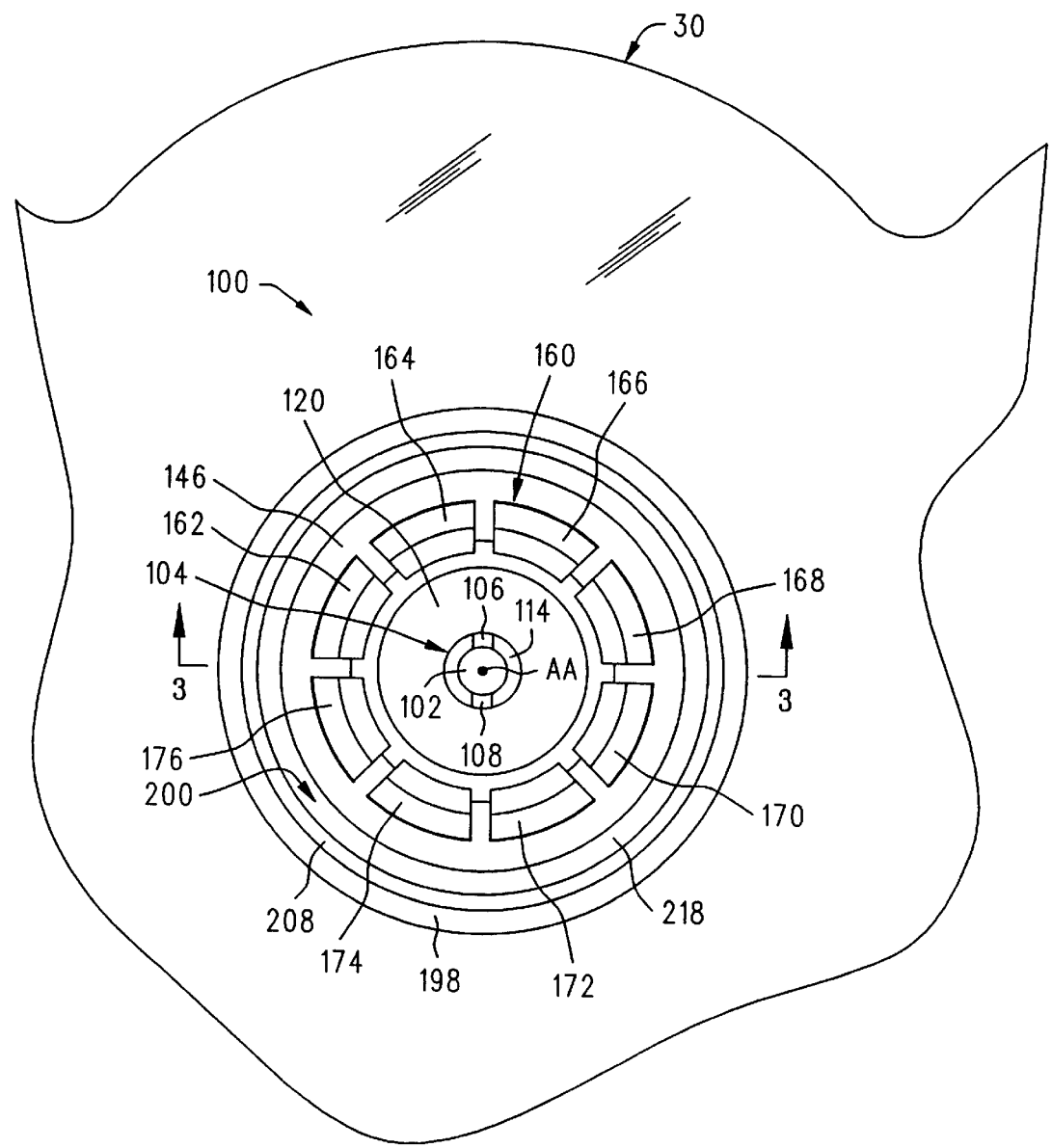
FIG. 2 is a top plan cutaway detail view of the battery vent structure of FIG. 1 with the vent manifold, safety valve and flame arrester removed.
Figure 3:
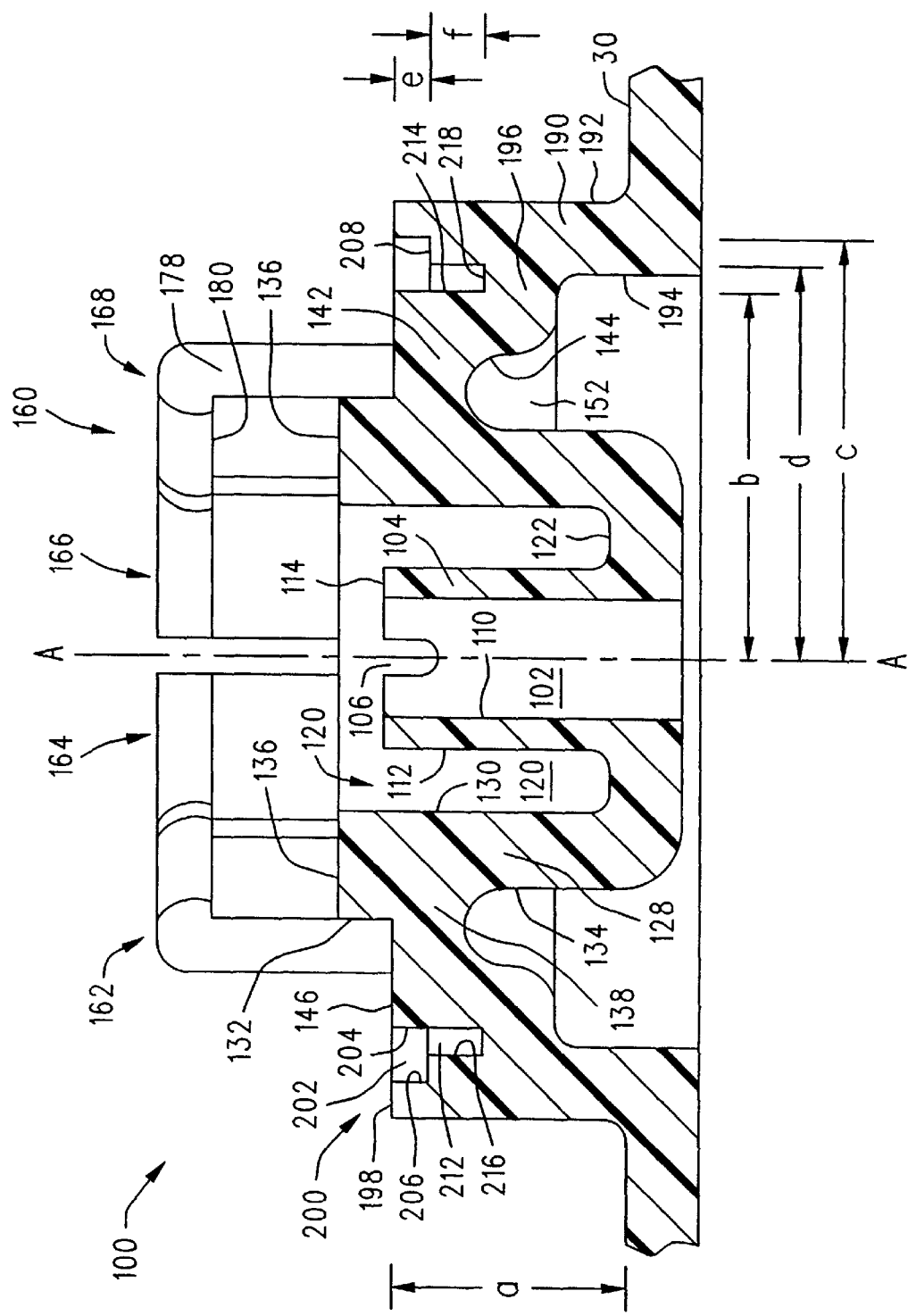
FIG. 3 is a cross-sectional elevation view of the battery vent structure of FIG. 1 taken along the line 3—3 of FIG. 2.

FIGS. 2 and 3 illustrate the battery vent structure 100 with the vent manifold 250 removed for clarity. Battery vent structure 100 includes a generally cylindrical vent opening 102 which is defined by the inner surface 110 of an inner annular wall portion 104, FIG. 3. Vent structure 100 has a central longitudinal axis AA about which the vent opening 102 and the inner annular wall portion 104 are concentrically arranged. Inner annular wall portion 104 may include the inner surface 110 previously described, an outer surface 112 and an upper surface 114 connecting the inner and outer surfaces 110, 112. A pair of notches 106, 108, FIG. 2, may be formed in the inner annular wall portion 104 intersecting the upper surface 114 as shown.

As can be appreciated from an examination of FIG. 3, vent opening 102 extends completely through the battery cover 30 and, thus, is in fluid communication with all of the battery cells 13, FIG. 1, of the battery 10. Accordingly, the vent opening 102 provides fluid communication between the battery cells 13 and the exterior of the battery case. The inner annular wall portion 104 may serve to mount a safety valve member 50, FIG. 7, in association with the opening 102 in a conventional manner, as will be described in further detail herein.

Surrounding the inner annular wall portion 104 is an generally annular space 120. Annular space 120 may be concentrically arranged with respect to the vent structure central longitudinal axis AA and is defined generally at its inner radius by the outer surface 112 of the annular wall portion 104 and at its outer radius by the inner surface 130 of an outer generally annular wall portion 128 as best seen in FIG. 3. Annular space 120 may also include a radiused lower surface 122 as shown.

Outer annular wall portion 128 may be concentrically arranged with respect to the vent structure central longitudinal axis AA and may include the inner surface 130, previously mentioned, a lower outer surface 134, an upper outer surface 132, a connecting portion 138 located between the lower and upper outer surfaces 134, 132 and an upper surface 136 connecting the inner surface 130 and the upper outer surface 132.

Surrounding the outer wall portion 128 is a shoulder portion 142. Shoulder portion 142 may include an arcuate lower surface 144 which, in combination with the outer annular wall lower outer surface 134, forms a downwardly facing annular space 152. Shoulder portion 142 may also include a generally planar upper surface 146. Shoulder portion 142 may be connected to the outer annular wall portion 128 via the outer annular wall portion connecting portion 138 as shown. Shoulder portion 142 may be concentrically arranged with respect to the vent structure central longitudinal axis AA.

A plurality of fingers 160 may be integrally formed with both the upper outer surface 132 of the outer annular wall portion 128 and the upper surface 146 of the shoulder portion 142 as shown. The fingers 160 may be concentrically arranged with respect to the vent structure central longitudinal axis AA and may include the individual fingers 162, 164, 166, 168, 170, 172, 174 and 176, FIG. 2. In a conventional manner, each of the fingers 160 may include an elongated portion and a catch member, such as the elongated portion 178 and catch member 180 of the finger 168, FIG. 3, for example. As can be seen, the catch portion of each of the fingers 160 extends at an angle with respect to the elongated portion. The catch portions of the fingers 160 serve to retain a flame arrester 60, FIG. 7, in place in a conventional manner. When the flame arrester 60 is in place, as shown, for example, in FIG. 7, it will be retained between the finger catch members, such as the catch member 180 of the finger 168, and the upper surface 136 of the outer annular wall portion 128.

Surrounding the shoulder portion 142 is a substantially annular perimeter wall portion 190 which is concentrically arranged with respect to the vent structure central longitudinal axis AA. Perimeter wall portion 190 may include an outer surface 192 which defines the radially outward extent of the battery vent structure 100. Perimeter wall portion 190 may also include an inner surface 194, a connecting portion 196 and an upper surface 198, as shown. Perimeter wall portion 190 may be connected to the shoulder portion 142 via the connecting portion 196. Perimeter wall portion upper surface 198 may be generally coplanar with the upper surface 146 of the shoulder portion 142, previously described. The perimeter wall portion 190 may extend a distance "a", FIG. 3, of about 0.27 inches above the remainder of the battery cover 30.

An annular groove 200 may be formed generally at the juncture of the shoulder portion 142 and the perimeter wall portion 190 as shown in FIGS. 1 and 2 and may be concentrically formed with respect to the vent structure central longitudinal axis AA. Groove 200 generally includes an upper groove portion 202 and a lower groove portion 212, FIG. 3. Upper groove portion 202 includes a generally cylindrical inner surface 204, a generally cylindrical outer surface 206 and a generally annular lower surface 208. Upper groove portion inner surface 204 may be concentrically arranged with respect to the vent structure central longitudinal axis AA and may be formed about a radius "b" of about 0.43 inches from the axis AA. Upper groove portion outer surface 206 may also be concentrically arranged with respect to the vent structure central longitudinal axis AA and may be formed about a radius "c" of about 0.49 inches from the axis AA. Upper groove portion 202 may have a depth "e" of about 0.04 inches between the perimeter wall upper surface 198 and the upper groove lower surface 208.

Lower groove portion 212 includes a generally cylindrical inner surface 214, a generally cylindrical outer surface 216 and a generally annular lower surface 218. Lower groove portion inner surface 214 may be coextensive with respect to the upper groove portion inner surface 204 and, thus, may also be concentrically arranged with respect to the vent structure central longitudinal axis AA and formed about the radius "b", previously set forth. Lower groove portion outer surface 216 may also be concentrically arranged with respect to the vent structure central longitudinal axis AA and may be formed about a radius "d" of about 0.43 inches from the axis AA. Lower groove portion 212 may have a depth "f" of about 0.10 inches between the upper groove lower surface 208 and the lower groove lower surface 218.

Figure 4:
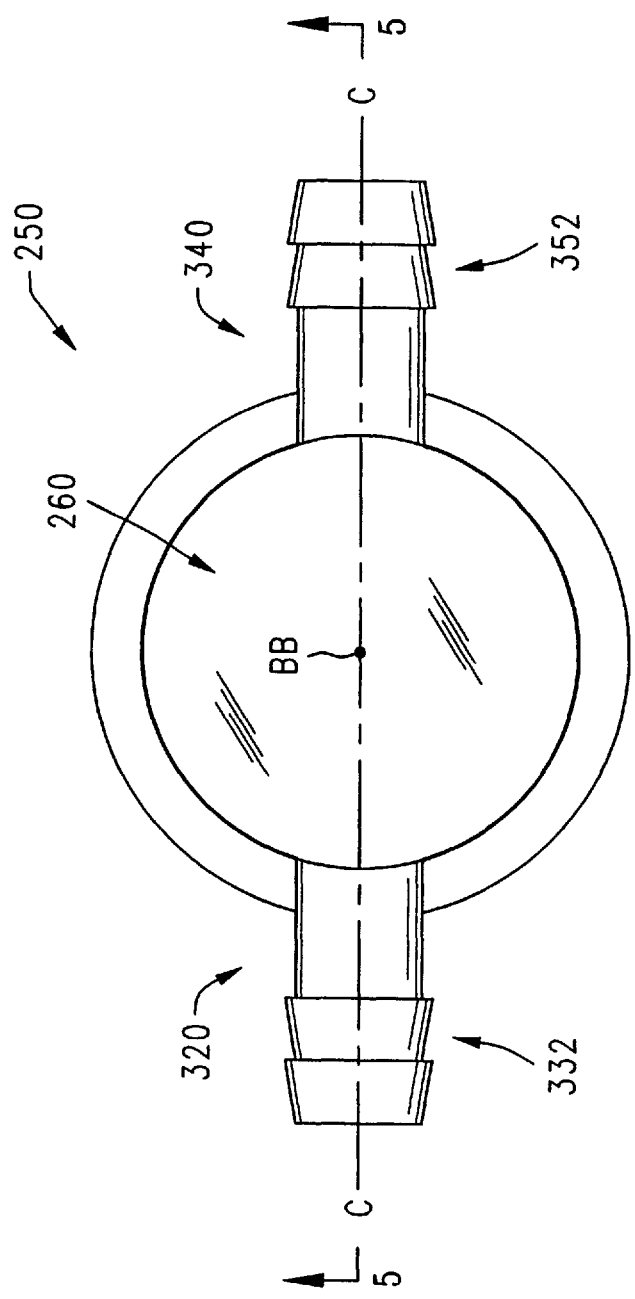
FIG. 4 is a top plan view of the vent manifold of FIG. 1.
Figure 5:
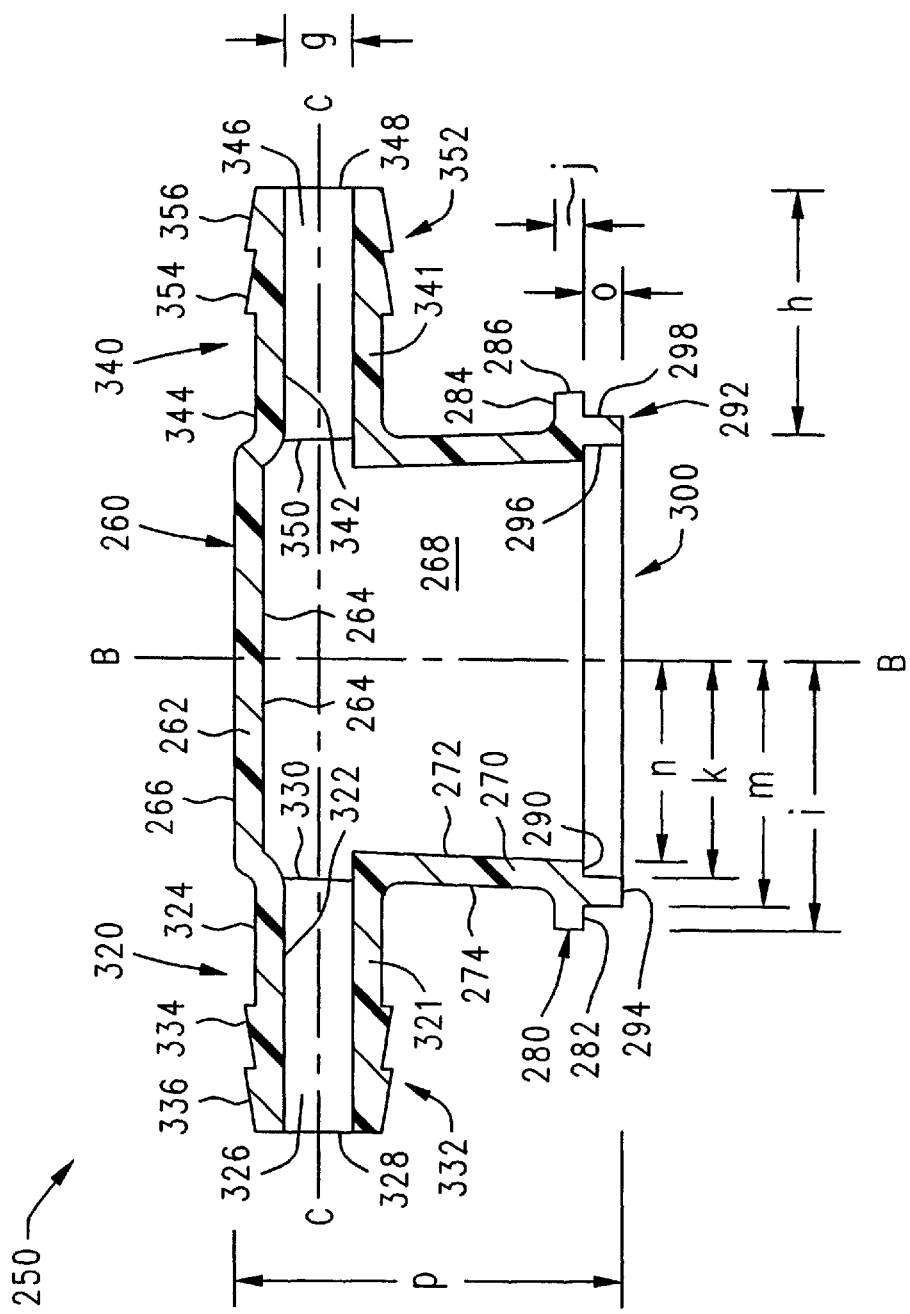
FIG. 5 is a cross-sectional elevation view of the vent manifold of FIG. 1 taken along the line 5—5 of FIG. 4.

FIGS. 4 and 5 illustrate the vent manifold 250 in detail. Referring to FIG. 4, it can be seen that the vent manifold 250 includes a generally cylindrical central body portion 260 having a central longitudinal axis BB. Vent manifold 250 also includes a pair of generally cylindrical connection members 320, 340 having a common central longitudinal axis CC which may be substantially perpendicular to the central body portion central longitudinal axis BB.

Referring to FIG. 5, central body portion 260 may have a height "p" of about 0.74 inches and may include an annular wall portion 270 which is concentrically formed with respect to the central longitudinal axis BB. Annular wall portion 270 includes generally cylindrical inner and outer surfaces 272 and 274, respectively. The inner surface 272 of annular wall portion 270 may be formed about a radius "n" of about 0.41 inches from the axis BB. Annular portion 270 may have a wall thickness of about 0.06 inches between the inner and outer surfaces 272, 274.

An upper wall portion 262 spans the top of the annular wall portion 270 as shown, closing the upper end of the vent manifold central body portion 260. Upper wall portion 262 includes generally circular inner and outer surfaces 264, 266, respectively. Upper wall portion 262 may have a wall thickness of about 0.06 inches between the inner and outer surfaces 264, 266. With further reference to FIG. 5, it can be seen that a chamber 268 is defined by the inner surface 264 of the upper wall 262 and the inner surface 272 of the annular wall portion 270.

Connection member 320 includes an annular wall member 321 having generally cylindrical inner and outer surfaces 322 and 324, respectively. Annular wall member 321 may have a wall thickness of about 0.05 inches extending between the inner and outer surfaces 322, 324. A generally cylindrical passageway 326 is defined within the inner surface 322 of the annular wall member 321. Passageway 326 extends between an outer opening 328 and an inner opening 330 which communicates with the central body portion chamber 268. Passageway 326 may have a diameter "g" of about 0.16 inches and a length "h" of about 0.60 inches and may be concentrically arranged with respect to the connection member central longitudinal axis CC.

Barbs 332, such as the individual barbs 334, 336 may be located on the outer surface 324 of the annular wall member 321. As discussed in further detail herein, the barbs 332 may be provided in order to facilitate attachment of a conduit, such as a flexible hose, onto the connection member 320 in a conventional manner, thus providing fluid communication between the conduit and the passageway 326 of the connection member 320 through the passageway outer opening 328. The thickness of the annular wall member 321 in the areas where the barbs 332 are present may be about 0.07 inches.

Connection member 340 includes an annular wall member 341 having generally cylindrical inner and outer surfaces 342 and 344, respectively. Annular wall member 341 may have a wall thickness of about 0.05 inches extending between the inner and outer surfaces 342, 344. A generally cylindrical passageway 346 is defined within the inner surface 342 of the annular wall member 341. Passageway 346 extends between an outer opening 348 and an inner opening 350 which communicates with the central body portion chamber 268. Passageway 346 may have a diameter and length which are equal to the diameter "g" and length "h" previously described with respect to the passageway 326 of the connection member 340. Passageway 346, like passageway 326, may be concentrically arranged with respect to the connection member central longitudinal axis CC.

Barbs 352, such as the individual barbs 354, 356 may be located on the outer surface 344 of the annular wall member 341. In a manner similar to that described previously with respect to the connection member 320, the barbs 352 located on the connection member 340 may be provided in order to facilitate attachment of a conduit, such as a flexible hose, onto the connection member 340 in a conventional manner, thus providing fluid communication between the conduit and the passageway 346 of the connection member 340 through the passageway outer opening 348. The thickness of the annular wall member 341 in the area where the barbs 352, are present may be about 0.07 inches.

Referring again to FIG. 5, vent manifold central body portion 260 may include a generally annular shoulder 280 extending radially from the outer surface 274 of the annular wall portion 270. Shoulder 280 may be concentrically arranged with respect to the central body portion central longitudinal axis BB. Shoulder 280 may include an annular lower surface 282, an annular upper surface 284 and a cylindrical outer surface 286. The outer surface 286 may be formed about a radius "i" of about 0.54 inches from the axis BB. Shoulder 280 may have a height "j" of about 0.06 inches extending between the shoulder lower and upper surfaces 282, 284.

Annular wall portion 270 may also include a downwardly facing surface 290 formed on the inner surface 272 thereof, as shown. Downwardly facing surface 290 may be generally coplanar with the lower surface 282 of the shoulder 280, previously described.

Extending downwardly from the lower surfaces 282, 290 is a generally annular flange 292. Flange 292 may be concentrically arranged with respect to the central body portion central longitudinal axis BB. Flange 292 may include an annular lower surface 294, a cylindrical inner surface 296 and a cylindrical outer surface 298. A generally circular vent manifold opening 300 is defined by the annular wall portion inner surface 272 generally adjacent the flange 292 and may be generally formed about the radius "n" previously described. Accordingly, the opening 300 may have a diameter of about 0.82 inches and a resulting area of about 0.52 square inches.

Flange inner surface 296 may be formed about a radius "k" of about 0.43 inches from the axis BB. Flange outer surface 298 may be formed about a radius "m" of about 0.49 inches from the axis BB. Accordingly, the flange 292 may have a radial thickness of about 0.06 inches, extending between its inner and outer surfaces 296, 298. Flange 292 may have a height "o" of about 0.08 inches. Accordingly, the downwardly facing surface 290 and the shoulder lower surface 282 may be spaced the distance "o" from the flange lower surface 294.

Figure 6:
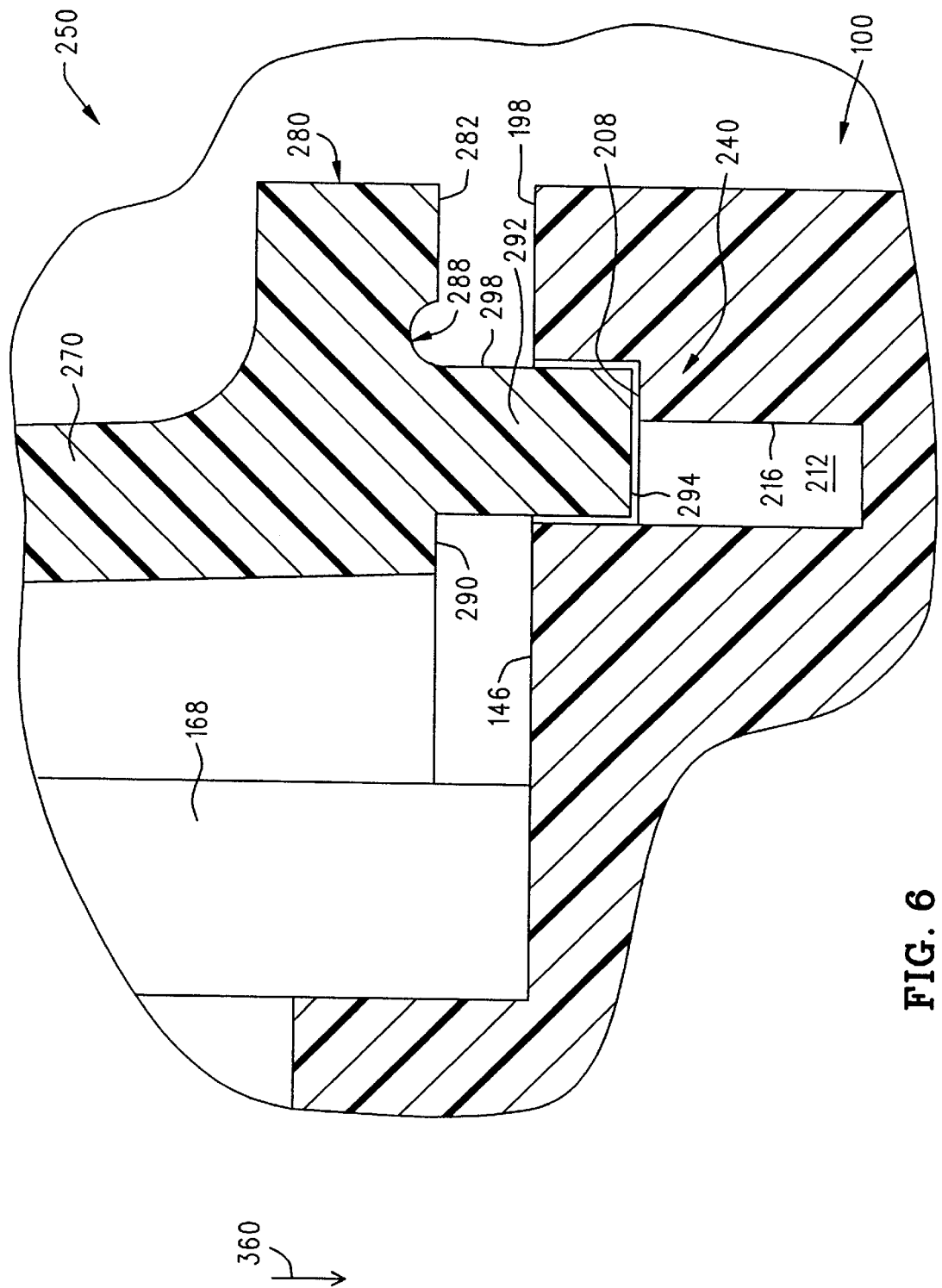
FIG. 6 is a cross-sectional elevation cutaway detail view of the vent manifold of FIG. 4 mounted on the battery vent structure of FIG. 2 prior to welding.

Referring to FIG. 6, it can be seen that vent manifold shoulder lower surface 282 may include an annular notch 288 which is generally located at the juncture of the shoulder lower surface 282 and the flange outer surface 298 as shown. The notch 288 may be radiused in cross-section, having a radius of about 0.01 inches.

Both the battery vent structure 100 and the vent manifold 250 may be formed of a plastic material, such as polypropylene. Preferably, both the battery vent structure 100 and the vent manifold 250 may be formed from the same plastic of which the battery cover 30 is formed.

Vent manifold 250 may be attached to the battery vent structure 100 in any conventional manner. In a preferred embodiment, however, the vent manifold 250 may be spin-welded onto the battery vent structure in a manner as will now be described in detail with respect to FIGS. 6 and 7.

FIG. 6 illustrates the vent manifold 250 located on the battery vent structure 100 before the spin-welding procedure is carried out. To mount the vent manifold 250 on the battery vent structure 100, the vent manifold 250 may first be placed over the battery vent structure 100 such that the vent manifold central longitudinal axis BB, e.g., FIG. 5, is substantially aligned with the battery vent structure central longitudinal axis AA, e.g., FIG. 3. The vent manifold 250 may then be moved downwardly, i.e., in the direction of the arrow 360 in FIG. 6, causing the vent manifold flange 292 to move into the battery vent structure upper groove portion 202, e.g., FIG. 3. This downward movement is continued until the vent manifold flange lower surface 294 contacts the battery vent structure upper groove lower surface 208 as shown in FIG. 6.

After the vent manifold 250 is located in place as described above, it may be spin-welded to the battery vent structure 100 by rotating the vent manifold 250 about its central longitudinal axis BB while applying a downward force to the vent manifold 250, i.e., in the direction of the arrow 360 in FIG. 6. The rotation described above is graphically illustrated, for example, by the arrow 362 in FIG. 1. Referring to FIG. 6, this rotation causes relative sliding movement between the vent manifold flange lower surface 294 and the battery vent structure upper groove lower surface 208. This sliding movement, in turn, causes frictional heating of the plastic material adjacent the surfaces 294 and 208. When heated, the plastic material softens and becomes deformable such that the downward force previously described causes the vent manifold flange portion 292 to deform and move downwardly into the battery vent structure groove lower portion 212. The battery vent structure material in the area indicated by the reference numeral 216 also deforms during this process. The downward movement of the vent manifold 250 and the plastic deformation described above continue until the vent manifold surfaces 290 and 282 contact the battery vent structure surfaces 146 and 198, respectively, as shown in FIG. 7.

Figure 7:
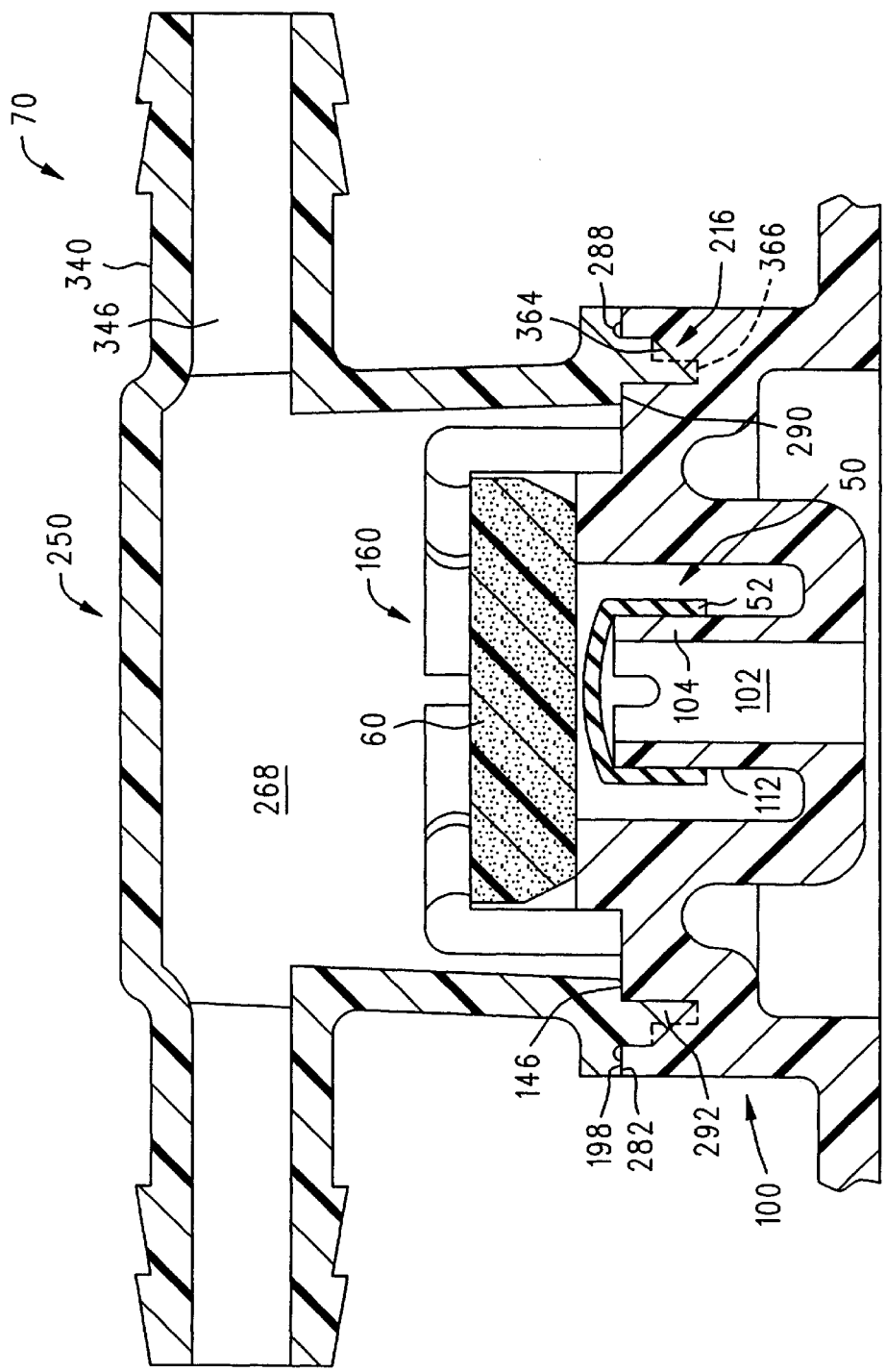
FIG. 7 is a cross-sectional elevation view of the vent manifold of FIG. 4 mounted on the battery vent structure of FIG. 2 after welding.

FIG. 7 illustrates the combined battery vent structure 100 and vent manifold 250 after completion of the spin welding procedure described above. It is noted that the original profile of the parts is indicated, for reference purposes, by the dashed line 366 in FIG. 7. As can be seen from FIG. 7, the vent manifold flange 292 and the battery vent structure area 216 have deformed such that a weld line 364 is formed and the original battery vent structure groove 200 is now completely filled with plastic material. The vent manifold notch 288 may be provided to serve as a "flash trap" which provides a collection space for any excess molten plastic material which, otherwise, might escape to the outside of the structure.

As can be appreciated, after completion of the spin-welding procedure described above, and after the welded parts have cooled, the vent manifold 250 will be securely attached to the battery vent structure 100. To accomplish the spin-welding procedure, the vent manifold may, for example, be rotated at a speed of about 2000 revolutions per minute while a downward force of about 125 lbs. is applied. The spin-welding procedure may be accomplished using a conventional spin-welding apparatus commercially available from Powell, McGee Associates, Inc. of Shoreview, Minn. and sold as Model PMA 95.

FIG. 7 also illustrates the fully assembled battery venting mechanism 70. As can be seen, a resealable safety valve 50 may be provided adjacent the battery vent opening 102 in a conventional manner in order to prevent battery gases from escaping the battery 10, FIG. 1, except in over-pressure situations as previously described. The safety valve may, for example, be a conventional Bunsen type safety valve which consists primarily of an elastomeric member 52 fitted over the battery vent structure annular wall portion 104 as shown. As is well-known, this type of valve will allow gas to escape when the pressure on the inside of the elastomeric member 52, i.e., within the vent opening 102, FIG. 3, becomes great enough relative to the air pressure on the outside of the elastomeric member 52. Specifically, sufficient relative pressure within the vent opening 102 will cause the elastomeric member 52 to expand and, thus, allow gas to escape between the annular wall upper surface 114, the annular wall outer surface 112, and the elastomeric member 52.

The notches 106, 108 formed in the vent opening annular wall portion 104, FIG. 2, as previously described, serve as an additional safety feature in a conventional manner. Specifically, the notches 106, 108 allow pressurized gas to escape therethrough should the valve elastomeric member 52 become pressed too tightly against the annular wall portion upper surface 114, FIG. 3.

A flame arrester 60 may be located above the safety valve 50 and retained by the battery vent structure fingers 160 in a conventional manner as previously described. The flame arrester 60 may be generally of the type available from Porex Technologies Corp. of Georgia located in Fairburn, Georgia and sold as Part No. 8087.

As can be appreciated, when battery gases exit the battery 10 through the opening 102 and safety valve 50, they will then pass through the flame arrester 60 and into the vent manifold chamber 268. The gases may then exit the chamber 268 through the passageways 326, 346 and be conducted safely away from the vicinity of the battery 10 via conduits attached to the connection members 320, 340.

Referring again to FIG. 7, it can be seen that the vent manifold chamber 268 is appropriately sized to completely house and/or cover both the flame arrester 60 and the safety valve 50. As can be appreciated, this arrangement reduces the likelihood of tampering with the flame arrester 60 and the underlying safety valve 50 which might otherwise occur.

Figure 8:
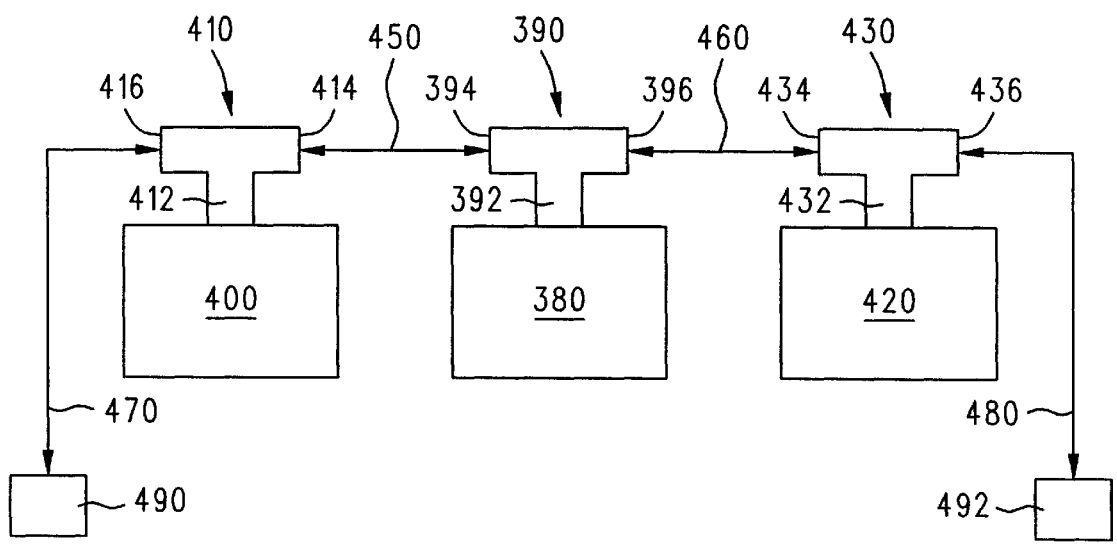
FIG. 8 is a schematic illustration showing a plurality of batteries interconnected for venting purposes using the battery vent structure of FIG. 2 and the vent manifold of FIG. 4.

FIG. 8 schematically illustrates how the vent mechanism 70 may be used to vent battery gases from a plurality of batteries 380, 400 and 420 away from the vicinity of the batteries. First battery 380 may include a first vent manifold 390 attached thereto having first, second and third openings 392, 394 and 396, respectively. First vent manifold first opening 392 is in fluid communication with the interior of the first battery 380. Second battery 400 may include a second vent manifold 410 attached thereto having first, second and third openings 412, 414 and 416, respectively. Second vent manifold first opening 412 is in fluid communication with the interior of the second battery 400.

Third battery 420 may include a third vent manifold 430 attached thereto having first, second and third openings 432, 434 and 436, respectively. Third vent manifold first opening 432 is in fluid communication with the interior of the third battery 420.

The batteries 380, 400, 420 may be each be identical to the battery 10 previously described in that each contains a battery vent structure identical to the battery vent structure 100 previously described. In a similar manner, the vent manifolds 390, 410, 430 may each be identical to the vent manifold 250 previously described and may each be attached to the respective battery vent structures of the batteries 380, 400, 420 in a manner identical to that previously described.

As can be appreciated, each of the vent manifold first openings 392, 412 and 432 correspond generally to the opening 300 in the vent manifold 250, FIG. 5. Each of the vent manifold second openings 394, 414 and 434 correspond generally to the outer opening 328 of the vent manifold 250, FIG. 5. Each of the vent manifold third openings 396, 416 and 436 correspond generally to the outer opening 348 of the vent manifold 250, FIG. 5.

Referring again to FIG. 8, a first conduit 450 may be attached between the first vent manifold second opening 394 and the second vent manifold second opening 414. A second conduit 460 may be attached between the first vent manifold third opening 396 and the third vent manifold second opening 434. A third conduit 470 may be connected to the second vent manifold third opening 416 and may have its opposite end connected to a venting source 490 located remotely from the batteries 380, 400, 420. Alternatively, the opposite end of the conduit 470 may be connected to another battery vent manifold located on an additional battery. In a similar manner, a fourth conduit 480 may be connected to the third vent manifold third opening 436 and may have its opposite end connected to a venting source 492 located remotely from the batteries 380, 400, 420. Alternatively, the opposite end of the conduit 480 may be connected to another battery vent manifold located on an additional battery.

Referring again to FIG. 8, the venting source 490 may include a conventional air movement device, such as a fan, in order to provide positive pressure within the venting system. As can be appreciated, when such a positive pressure device is used, fresh air will flow from the venting source 490, through the conduit 470 and into the vent manifold 410. Thereafter, the air will flow through the conduit 430, the vent manifold 390, the conduit 460, the vent manifold 430, the conduit 480 and finally to the venting source 492 which may, for example, simply comprise a vent opening. In this manner, the venting system is constantly purged, thus eliminating any accumulation of battery gases within the system.

Alternatively, the venting source 490 may be operated as a negative pressure source, thus causing a reversal of the airflow described above through the venting system. As a further alternative, the venting source 490 may supply a pressurized inert gas, e.g., nitrogen, throughout the venting system. Use of an inert gas in this manner, will eliminate the potential for explosions even should battery gases, such as hydrogen, accumulate within the system.

As can be appreciated, the vent manifold 250 having three openings as described above allows a plurality of batteries to be interconnected for venting purposes, thus eliminating the need to provide a separate conduit leading from each battery to the venting area. It is noted that, although three batteries are shown in FIG. 8 for illustration purposes, as few as two batteries could be interconnected. In addition, more than three batteries could also easily be interconnected using the venting mechanism described herein.

As a further alternative, the venting mechanism 70 could be used in conjunction with a single battery. In such an application, the vent manifold first connection member 320, FIG. 4, may be attached to an air movement device, such as that previously described with respect to the venting source 490 of FIG. 8. The vent manifold second connection member 340, FIG. 4, may then be attached to a simple vent opening, such as the vent opening previously described with respect to the venting source 492. As can be appreciated, this arrangement allows a single battery to be vented. Specifically, the vent manifold 250 having three openings, as described herein, allows both a venting source and a purging air supply source to be connected to a single battery vent opening, thus providing for battery venting and for purging of the venting system.

It is further noted that, although described with respect to a spirally wound battery for illustrative purposes, the present invention could be used in conjunction with a battery having any alternate configuration. Also, although described generally with respect to a lead-acid battery, the present invention could be used with any type of battery where venting is desired. The venting mechanism 70 may be used either with or without the safety valve 50 and flame arrester 60 previously described.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A venting system for venting gas from a plurality of batteries, said system comprising:
    at least a first battery including:
        a. a first battery container;
        b. a plurality of first battery cells housed within said first battery container; and
        c. a first battery container opening located in said first battery container, wherein said first battery container opening is in fluid communication with each of said plurality of first battery cells;
    at least a first vent manifold including:
        a. a first vent manifold first opening;
        b. a first vent manifold second opening in fluid communication with said first vent manifold first opening; and
        c. a first vent manifold third opening in fluid communication with said first vent manifold first opening and said first vent manifold second opening;
    wherein said first vent manifold is attached to said first battery container; and
    wherein said first vent manifold first opening is in fluid communication with said first battery container opening.

2. The system of claim 1 and further comprising:
    at least a second battery including:
        a. a second battery container;
        b. a plurality of second battery cells housed within said second battery container; and
        c. a second battery container opening located in said second battery container, wherein said second battery container opening is in fluid communication with each of said plurality of second battery cells;
    wherein said first vent manifold second opening is in fluid communication with said second battery container opening.

3. The system of claim 2 and further comprising:
    at least a third battery including:
        a. a third battery container;
        b. a plurality of third battery cells housed within said third battery container; and
        c. a third battery container opening located in said third battery container, wherein said third battery container opening is in fluid communication with each of said plurality of third battery cells;
    wherein said first vent manifold third opening is in fluid communication with said third battery container opening.

4. The system of claim 3 and further comprising:
    at least a second vent manifold including:
        a. a second vent manifold first opening;
        b. a second vent manifold second opening in fluid communication with said second vent manifold first opening; and
        c. a second vent manifold third opening in fluid communication with said second vent manifold first opening and said second vent manifold second opening;
    wherein said second vent manifold is attached to said second battery container;
    wherein said second vent manifold first opening is in fluid communication with said second battery container opening; and
    wherein said second vent manifold second opening is in fluid communication with said first vent manifold second opening.

5. The system of claim 4 and further comprising:
    at least a third vent manifold including:
        a. a third vent manifold first opening;
        b. a third vent manifold second opening in fluid communication with said third vent manifold first opening; and
        c. a third vent manifold third opening in fluid communication with said third vent manifold first opening and said third vent manifold second opening;
    wherein said third vent manifold is connected to said third battery container;
    wherein said third vent manifold first opening is in fluid communication with said third battery container opening; and
    wherein said third vent manifold second opening is in fluid communication with said first vent manifold third opening.

6. The system of claim 1 and further comprising a flame arrester operatively associated with said first battery container opening.

7. The system of claim 6 wherein said flame arrester is attached to said first battery container.

8. The system of claim 7 wherein said flame arrester is at least partially located within at least a portion of said at least a first vent manifold.

9. The system of claim 1 wherein said first vent manifold first opening has a first opening area, said first vent manifold second opening has a second opening area and said first vent manifold third opening has a third opening area and wherein said first opening area is substantially larger than said second opening area and said third opening area.

10. The system of claim 9 wherein:
    said first vent manifold first opening is substantially circular and has a diameter of about 0.82 inches; and
    said first vent manifold second opening is substantially circular and has a diameter of about 0.16 inches.

11. A method of venting fluid produced by a plurality of batteries away from the vicinity of said plurality of batteries, said method comprising:

providing at least a first battery, said at least a first battery including:
a. a first battery container;
b. a plurality of first battery cells housed within said first battery container; and
c. a first battery container opening located in said first battery container, wherein said first battery container opening is in fluid communication with each of said plurality of first battery cells;

providing at least a first vent manifold connected to said first battery container, said at least a first vent manifold including:
a. a first vent manifold first opening;
b. a first vent manifold second opening in fluid communication with said first vent manifold first opening; and
c. a first vent manifold third opening in fluid communication with said first vent manifold first opening and said first vent manifold second opening;

providing at least a second battery, said second battery including:
a. a second battery container;
b. a plurality of second battery cells housed within said second battery container; and
c. a second battery container opening located in said second battery container, wherein said second battery container opening is in fluid communication with each of said plurality of second battery cells;

establishing fluid communication between said first vent manifold second opening and said second battery container opening.

12. The method of claim 11 and including the further steps of:

providing at least a third battery, said at least a third battery including:
a. a third battery container;
b. a plurality of third battery cells housed within said third battery container; and
c. a third battery container opening located in said third battery container, wherein said third battery container opening is in fluid communication with each of said plurality of third battery cells;

establishing fluid communication between said first vent manifold third opening and said third battery container opening.

13. The method of claim 12 and including the further steps of:

providing at least a second vent manifold connected to said second battery container, said at least a second vent manifold including:
a. a second vent manifold first opening;
b. a second vent manifold second opening in fluid communication with said second vent manifold first opening; and
c. a second vent manifold third opening in fluid communication with said second vent manifold first opening and said second vent manifold second opening;

establishing fluid communication between said second vent manifold first opening and said second battery container opening; and establishing fluid communication between said second vent manifold second opening and said first vent manifold second opening.

14. The method of claim 13 and including the further steps of:

providing at least a third vent manifold connected to said third battery container, said at least a third vent manifold including:
a. a third vent manifold first opening;
b. a third vent manifold second opening in fluid communication with said third vent manifold first opening; and
c. a third vent manifold third opening in fluid communication with said third vent manifold first opening and said third vent manifold second opening;

establishing fluid communication between said third vent manifold first opening and said third battery container opening; and establishing fluid communication between said third vent manifold second opening and said first vent manifold third opening.

15. The method of claim 11 and including the further step of operatively associating a flame arrester with said first battery container opening.

16. The method of claim 15 wherein said step of operatively associating includes attaching said flame arrester to said first battery container.

17. The method of claim 15 wherein said step of operatively associating includes at least partially locating said flame arrester within at least a portion of said at least a first vent manifold.

* * * * *